United States Patent
Kaikkonen et al.

(10) Patent No.: US 7,801,496 B2
(45) Date of Patent: *Sep. 21, 2010

(54) METHOD TO ENABLE OPEN LOOP ANTENNA TRANSMIT DIVERSITY ON CHANNELS HAVING DEDICATED PILOTS

(76) Inventors: Jorma Kaikkonen, Taskilanti 27 D15, 09580 Oulu (FI); Markku Kuusela, Tallberginkatu 3 as. 40, 00180 Helsinki (FI); Sari Nielsen, Bredankuja 7 G25, 02750 Espoo (FI); Jussi Numminen, Liinahaankatu 26 as. 11, 20320 Turku (FI)

( * ) Notice: Subject to any disclaimer, the term of this patent is extended or adjusted under 35 U.S.C. 154(b) by 184 days.

This patent is subject to a terminal disclaimer.

(21) Appl. No.: 12/052,373

(22) Filed: Mar. 20, 2008

(65) Prior Publication Data

US 2008/0227423 A1    Sep. 18, 2008

Related U.S. Application Data

(63) Continuation of application No. 11/100,341, filed on Apr. 5, 2005, now Pat. No. 7,356,313.

(60) Provisional application No. 60/559,673, filed on Apr. 5, 2004.

(51) Int. Cl.
*H04B 1/16* (2006.01)
(52) U.S. Cl. .................................... 455/101
(58) Field of Classification Search ............. 455/550.1, 455/562.1, 101, 135, 136, 277.1, 277; 375/267, 375/347
See application file for complete search history.

(56) References Cited

U.S. PATENT DOCUMENTS

| | | | |
|---|---|---|---|
| 6,600,934 B1 * | 7/2003 | Yun et al. | 455/562.1 |
| 2002/0044591 A1 | 4/2002 | Lee et al. | |
| 2002/0177468 A1 | 11/2002 | Takeuchi et al. | |
| 2003/0142755 A1 | 7/2003 | Chi et al. | |
| 2005/0047529 A1 | 3/2005 | Luo | |
| 2007/0105508 A1 * | 5/2007 | Tong et al. | 455/101 |
| 2007/0189409 A1 | 8/2007 | Hottinen | |

FOREIGN PATENT DOCUMENTS

| WO | WO 00/11876 | 3/2000 |
|---|---|---|
| WO | WO 02/080380 | 10/2002 |
| WO | WO 02/089358 | 11/2002 |

OTHER PUBLICATIONS

The International Search Report and Written Opinion for PCT/IB2005/000881 mailed on Jul. 21, 2005.
The International Preliminary Report on Patentability completed on Apr. 19, 2006.

* cited by examiner

*Primary Examiner*—Thanh C Le (57) ABSTRACT

Methods, computer-readable media, and devices are provided that support antenna diversity in a communication system. In an exemplary method, a signal is received from a first device at a second device in a first channel. A determination is made concerning whether or not transmit diversity is applied to the first channel. If transmit diversity is applied to the first channel; a first channel estimate is determined based on a first pilot signal received from the first device and a second channel estimate is determined based on a second pilot signal received from the first device. The received signal is decoded based on the first channel estimate and the second channel estimate.

30 Claims, 5 Drawing Sheets

METHOD TO ENABLE OPEN LOOP ANTENNA TRANSMIT DIVERSITY ON CHANNELS HAVING DEDICATED PILOTS

CROSS-REFERENCE TO RELATED APPLICATIONS

This application is a continuation filed under 35 U.S.C. §120 of U.S. patent application Ser. No. 11/100,341 that was filed Apr. 5, 2005, the disclosure of which is incorporated by reference in its entirety. U.S. patent application Ser. No. 11/100,341 claims the benefit of U.S. Provisional Patent Application Ser. No. 60/559,673 that was filed Apr. 5, 2004, the disclosure of which is incorporated by reference in its entirety.

FIELD

The present invention relates to carrying out transmit antenna diversity from a base station to mobile stations and, more particularly, to doing so in a system with both mobile stations equipped to handle antenna diversity and mobile stations not so equipped.

BACKGROUND

Figure 4:
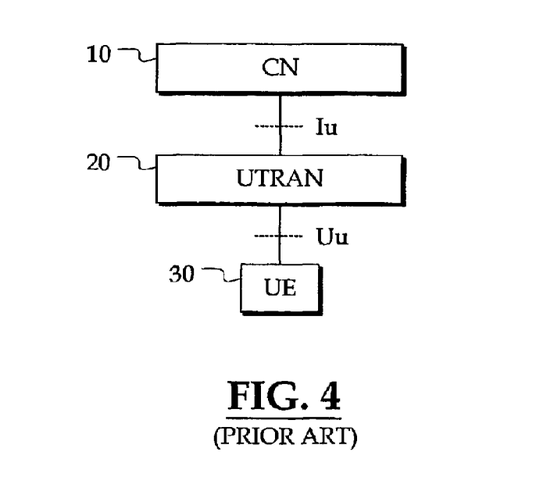
FIG. 4 shows a prior art top-view diagram of a UMTS architecture.

FIG. 4 shows a prior art top-view diagram of the so-called UMTS architecture where the acronym UMTS stands for Universal Mobile Telecommunications System. It includes a core network 10, a UTRAN 20 connected to the core network by a so-called Iu-interface and user equipment 40 connected to the UTRAN 20 by a so-called Uu-interface. The acronym UTRAN stands for UMTS Terrestrial Radio Access Network.

Figure 5:
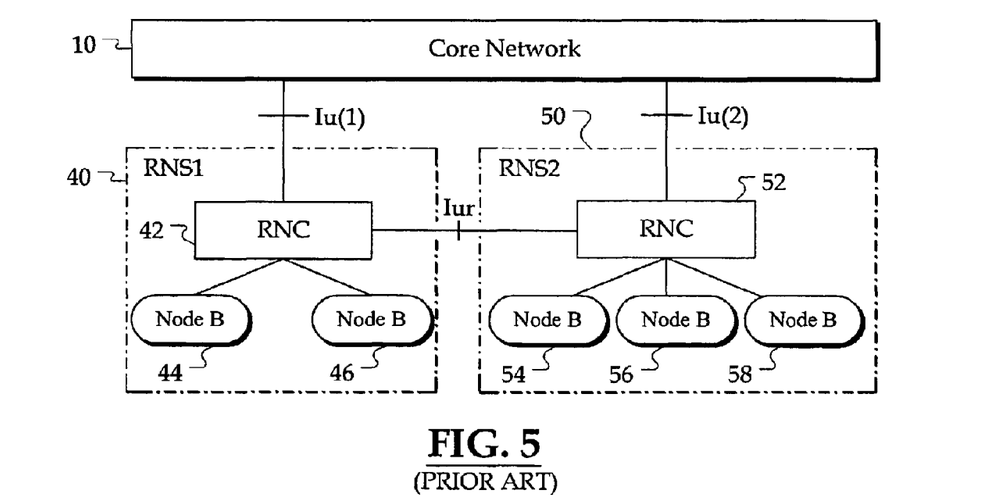
FIG. 5 shows amore detailed illustration of the UTRAN of FIG. 1.

FIG. 5 shows a more detailed illustration of the UTRAN of FIG. 1. As shown, the core network may be attached to various radio network subsystems 40, 50, each of which includes a radio network controller interconnected by a so-called Iur-interface. Each of the radio network controllers 42, 52 may be connected to a plurality of base stations, called "Node B's" in the third generation. These Node B's are the network elements that have the radio interface (Uu) with the UEs. Antenna transmit diversity allows a same signal to be transmitted via more than one antenna in the same Node B in order to create multipath diversity where it would not otherwise exist. The mobile station receiver combines the plural signals into a composite and is thereby better enabled to perform signal estimation. In the current Third Generation Partnership Project (3GPP) specification defining the functionality of UMTS Terrestrial Radio Access Network (UTRAN), two transmit diversity modes are defined, namely Open Loop Mode including Space Time Block Coding Based Transmit Diversity (STTD) which is an open-loop mode applicable to both common and dedicated channels and Time-switched transmit diversity (TSTD) applicable to the synchronization channel (SCH), and a Closed Loop Mode including Modes 1 (only phase can be adjusted) and 2 (phase and amplitude can be adjusted) applicable to dedicated channels only. A closed loop mode is only used for dedicated channels due to the need for an associated uplink feedback channel for sending adjustment commands to the base station (Node B) to maximize the UE's received power. In the first phase of deployment of 3GPP systems the capacity and performance enhancement offered by transmit diversity was not seen as an important feature by operators, and consequently user equipment (UE) is currently deployed in the field that does not support transmit diversity modes as mandated by the 3GPP specification. This prevents operators from enabling the transmit diversity modes and this could mean significant degradation in service quality for such users which have mobile terminals not supporting the transmit diversity modes. This invention describes how the open loop transmit diversity mode functionality could be modified so that it could be only enabled for UEs supporting it.

For instance, if a UE does not support the STTD transmit diversity scheme as described in the 3GPP specifications and this mode is enabled in a network within which the UE is operating, it will it result in significant degradation in the operation of the UE. Based on the current specification, if the transmit (Tx) diversity is enabled in the network, Tx diversity will be applied at least on a primary common control physical channel (P-CCPCH) and synchronization channel (SCH) and additionally, a common pilot channel (CPICH) shall be transmitted from both antennas using the same channelization and scrambling code but with different pre-defined bit sequences as specified in 3GPP TS 25.211, v 6.0.0 (2003-12), Physical Channels and Mapping of Transport Channels onto Physical Channels (FDD). In practice in order to make the system to work properly Tx diversity would also be applied on the rest of the common channels. If the UE does not support the STTD scheme it is unable to benefit from the transmission from the antenna 2 because it sees its transmission only as interference. This will result in significant loss in demodulation performance and also degrade the performances of initial synchronization and neighbor cell search. Hence, currently the capacity and service quality improvement offered by this transmit diversity mode cannot be utilized before all deployed UEs fully support STTD.

SUMMARY

According to a first aspect of the present invention, a method for carrying out antenna diversity in a system having a base station transmitting to user equipment equipped to process signals transmitted from more than one antenna of the base station, comprises transmitting channels from said more than one antenna from said base station to said user equipment for selected channels having dedicated pilots and transmitting channels from only one antenna for at least certain common channels, which are for user equipment equipped only to process signals transmitted from one antenna, and other selected channels, and receiving and processing both said certain common channels and said channels having dedicated pilots in said user equipment equipped to process signals transmitted from more than one antenna and receiving and processing both said certain common channels and said other selected channels in said user equipment equipped only to process signals transmitted from one antenna.

According to a second aspect of the present invention, a base station for carrying out antenna diversity in a system having the base station transmitting to user equipment equipped to process signals transmitted from more than one antenna of the base station, comprises means for transmitting channels from said more than one antenna from the base station to the user equipment for selected channels having dedicated pilots; and means for transmitting channels from only one antenna for certain common channels and other selected channels, both said certain common channels and said channels having dedicated pilots for reception and processing by said user equipment equipped to process signals transmitted from more than one antenna and both said certain common channels and said other selected channels for reception and processing in user equipment equipped only to process signals transmitted from one antenna.

According to a third aspect of the present invention, user equipment for utilizing antenna diversity in a system having the base station transmitting to user equipment equipped to process signals transmitted from more than one antenna of the base station, comprises means for receiving both certain common channels transmitted from one antenna and selected channels having dedicated pilots from more than one antenna in user equipment equipped to process signals transmitted from said more than one antenna; and means for processing both said certain common channels transmitted from one antenna and said selected channels having dedicated pilots from more than one antenna in user equipment equipped to process signals transmitted from said more than one antenna.

According to a fourth aspect of the present invention, a system with antenna diversity comprises a base station transmitting to user equipment equipped to process signals transmitted from more than one antenna of the base station, wherein said base station comprises means for transmitting channels from said more than one antenna from said base station to said user equipment for selected channels having dedicated pilots and transmitting channels from only one antenna for at least certain common channels, which are for user equipment equipped only to process signals transmitted from one antenna, and other selected channels, and wherein said user equipment comprises means for receiving and processing both said certain common channels and said channels having dedicated pilots in said user equipment equipped to process signals transmitted from more than one antenna and receiving and processing both said certain common channels and said other selected channels in said user equipment equipped only to process signals transmitted from one antenna.

According to a fifth aspect of the present invention, a method for execution by a base station for carrying out antenna diversity in a system having the base station transmitting to user equipment equipped to process signals transmitted from more than one antenna of the base station, comprises transmitting channels from said more than one antenna from the base station to the user equipment for selected channels having dedicated pilots, and transmitting channels from only one antenna for certain common channels and other selected channels, both said certain common channels and said channels having dedicated pilots for reception and processing by said user equipment equipped to process signals transmitted from more than one antenna and both said certain common channels and said other selected channels for reception and processing in user equipment equipped only to process signals transmitted from one antenna.

According to a sixth aspect of the present invention, a method for execution by user equipment for utilizing antenna diversity in a system having the base station transmitting to the user equipment equipped to process signals transmitted from more than one antenna of the base station, comprises receiving both certain common channels transmitted from one antenna and selected channels having dedicated pilots from more than one antenna in user equipment equipped to process signals transmitted from said more than one antenna, and processing both said certain common channels transmitted from one antenna and said selected channels having dedicated pilots from more than one antenna in user equipment equipped to process signals transmitted from said more than one antenna.

According to a seventh aspect of the present invention, a computer program product comprises a computer readable medium having coded instructions stored thereon for execution by a base station for carrying out antenna diversity in a system having the base station transmitting to user equipment equipped to process signals transmitted from more than one antenna of the base station, wherein steps of said coded instructions comprise transmitting channels from said more than one antenna from the base station to the user equipment for selected channels having dedicated pilots, and transmitting channels from only one antenna for certain common channels and other selected channels, both said certain common channels and said channels having dedicated pilots for reception and processing by said user equipment equipped to process signals transmitted from more than one antenna and both said certain common channels and said other selected channels for reception and processing in user equipment equipped only to process signals transmitted from one antenna.

According to an eighth aspect of the present invention, a computer program product comprises a computer readable medium having coded instructions stored thereon for execution by user equipment for utilizing antenna diversity in a system having a base station transmitting to the user equipment equipped to process signals transmitted from more than one antenna of the base station, wherein steps of said coded instructions comprise receiving both certain common channels transmitted from one antenna and selected channels having dedicated pilots from more than one antenna in user equipment equipped to process signals transmitted from said more than one antenna, and processing both said certain common channels transmitted from one antenna and said selected channels having dedicated pilots from more than one antenna in user equipment equipped to process signals transmitted from said more than one antenna.

The aim of the proposed invention is to enable the use of the STTD in a network so that the common channels (CPICH etc.) do not need to be transmitted using transmit diversity, but the STTD can be enabled only for channels having dedicated pilots and which are intended for the UEs supporting this functionality.

In normal transmit diversity operation the UE will use the CPICH transmitted form both antennas as a phase reference. In the proposed method some of the common channels including CPICH are transmitted without transmit diversity even though the STTD is used on channels having dedicated pilots and which are intended for the UEs supporting this functionality. In order to successfully receive the channel transmitted using the STTD the UE needs to acquire a channel estimate for the signal transmitted from antenna 2. This can be achieved by using the dedicated pilots transmitted in the corresponding downlink (DL) channels. The CPICH can remain as the phase reference for the finger allocation and for channel estimation of the signal transmitted from antenna 1 in a similar manner as done without transmit diversity. This means the UE can continue using CPICH for impulse response measurements used e.g. for finger allocation since the basic assumption for any transmit diversity scheme defined in 3GPP is that there is not any noticeable delay difference between signals the UE receives from different transmit antennas.

Note that the basic assumption is that the same antenna pattern is used for the CPICH and for the channels which are transmitted through antennas 1 and 2 to the UEs supporting this functionality and which have dedicated pilots, in order to cover the same cell area and to have the same propagation profile (hence no beam forming is used). Note also that the described functionality can be applied to channels transmitted to the UEs supporting this feature which do not have dedicated pilots but the associated channels present in conjunction with these channels do (e.g. DSCH, HS-DSCH).

Furthermore the measurements related to radio resource management (RRM), e.g., cell reselection and handover evaluation, would still be performed in a similar manner as without transmit diversity keeping the cell dimensioning and measurements equal as for a UE not supporting this feature. This is the most feasible choice since the UE has to be connected to the best cell without transmit diversity since transmit diversity is not anyway applied to each of the common channels. Hence, cell coverage is not increased when transmit diversity is only used on dedicated channels. However, due to a lower signal to noise ratio (Eb/No) target needed for meeting the given block error rate (BLER) target the dedicated channel transmit diversity is expected to a give capacity gain. Link level simulation results are shown below in the detailed description.

The transmit diversity method of the present invention could also be applied selectively on certain common channels such as on a secondary common control physical channel (S-CCPCH) which is not transmitted for all user equipment. This could, e.g., be a case for multimedia broadcast multicast service (MBMS), where one S-CCPCH is used for normal paging and forward access channel (FACH) and some other S-CCPCH(S) for MBMS. Hence, according to the present invention, not all common channels are necessarily transmitted using one antenna only.

DETAILED DESCRIPTION

In the preferred embodiment the STTD decoding of the STTD branch transmitted via diversity antenna (i.e., the antenna having no primary common pilot available) is done by using the corresponding dedicated pilots as a phase reference, whereas in the STTD decoding of the first STTD branch transmitted via non-diversity antenna we utilize common pilots as a phase reference. In order to maintain the orthogonality between the STTD branches it is essential, that before the utilization of the channel estimate of the diversity antenna, computed from the corresponding dedicated pilots, in the STTD decoding process it is scaled by $$\sqrt{\frac{P_{CPICH}}{P_{DPCH}^{div}}},$$

where $P_{CPICH}$ is the transmission power of the common pilot transmitted via non-diversity antenna, and $$P_{DPCH}^{div}$$

is the transmission power of the dedicated pilot sequence of the corresponding channel transmitted via diversity antenna. Otherwise the orthogonality between STTD branches is lost and the performance of STTD is severely degraded.

Note the following equations are only intended to facilitate the reading and the understanding of this invention. However they are partly covered in various STTD papers including "A Simple Transmit Diversity Technique for Wireless Communications" by S. M. Alamouti, IEEE Journal on Select Areas in Communications, Vol. 16, No. 8, October 1998, pp. 1451-8 and "New Detection Schemes for Transmit Diversity with no Channel Estimation" by Tarokh et al, IEEE 1998 International Conference on Universal Personal Communications, Florence, Italy, 5-9 Oct. 1998, pp. 917-920 vol. 2.

To illustrate this, it is reasonable to present how the decoding of an STTD encoded signal is done assuming that a RAKE receiver is used. At the transmitter side the STTD encoding is done by the following mapping:

$$(s_1, s_2) \mapsto \begin{bmatrix} s_1 & s_2 \\ -s_2^* & s_1^* \end{bmatrix}.$$

Assuming STTD encoding at the transmitter the received vector $r_i$ from the ith multipath is:

$$r_i = \begin{bmatrix} r_{i,1} \\ r_{i,2} \end{bmatrix} = \sqrt{\frac{P_{tot}}{2}} \begin{bmatrix} h_{1,i}s_1 - h_{2,i}s_2^* \\ h_{1,i}s_2 + h_{2,i}s_1^* \end{bmatrix} + \begin{bmatrix} n_{1,i} \\ n_{2,i} \end{bmatrix},$$

where $P_{tot}$ is the total transmission power of the channel where the STTD-encoded transmission takes place, i is the multipath index and $h_j$ is the channel coefficient between the jth tx-antenna and receiver, and $n_j$ is the corresponding noise term. The division of $P_{tot}$ by the factor 2 comes from the fact that $P_{tot}$ is equally divided between the two transmit antennas.

By taking a complex conjugate of $r_{2,i}$ we obtain a modified vector $r_i'$ which can be presented by the following matrix-equation:

$$r_i' = \begin{bmatrix} r_{i,1} \\ r_{i,2}^* \end{bmatrix} = \sqrt{\frac{P_{tot}}{2}} \begin{bmatrix} h_{1,i} & -h_{2,i} \\ h_{2,i}^* & h_{1,i}^* \end{bmatrix} \begin{bmatrix} s_1 \\ s_2^* \end{bmatrix} + \begin{bmatrix} n_{1,i} \\ n_{2,i} \end{bmatrix} = H_{D,i}s' + n_i.$$

In the matched filtering operation $r_i'$ is multiplied from left hand side by the Hermitean conjugate of the matrix $$H_{D,i},$$

which is defined by $$\hat{H}_{D,i} = \begin{bmatrix} \hat{h}_{1,i} & -\hat{h}_{2,i} \\ \hat{h}_{2,i}^* & \hat{h}_{1,i}^* \end{bmatrix}$$

where $h_{k,i}$ is the channel estimate of the ith multipath component of kth transmit antenna. If CPICH is used as a phase reference for both transmit antennas, $$\hat{h}_{k,i} \approx \sqrt{\frac{P_{CPICH}}{2}} h_{k,i},$$

and thus the output of the rake combiner is the following:

$$\sum_{i=1}^{L} H_{D,i}^{H} r'_i = \sum_{i=1}^{L} (H_{D,i}^{H} H_{D,i})s' + \sum_{i=1}^{L} H_{D,i}^{H} n_i$$

$$= \sum_{i=1}^{L} M_i s' + \sum_{i=1}^{L} H_{D,i}^{H} n_i,$$

where L is the number of resolvable multipath components and the matrix $M_1$ can be written as $$M_i = \frac{\sqrt{P_{tot} \cdot P_{CPICH}}}{2} \begin{bmatrix} |h_{1,i}|^2 + |h_{2,i}|^2 & 0 \\ 0 & |h_{1,i}|^2 + |h_{2,i}|^2 \end{bmatrix}. \quad (2)$$

Due to the orthogonality of the STTD transmission all non-diagonal elements of $M_1$ are non-zero.

Let us now assume, that CPICH is transmitted only via non-diversity antenna and STTD decoding is accomplished by using the preferred embodiment, i.e., in the STTD decoding of the received signal the non-diversity antenna uses a channel estimate computed from CPICH and the diversity antenna uses the channel estimate computed from the corresponding dedicated pilots. In that case $$\hat{h}_{1,i} \approx \sqrt{P_{CPICH}} h_{1,i} \text{ and } \hat{h}_{2,i} \approx x\sqrt{P_{DPCH}^{div}} h_{2,i},$$

where x is the scaling factor of the dedicated channel estimate of the diversity antenna. By using the abbreviations $$a = \sqrt{P_{CPICH}} \text{ and } b = x\sqrt{P_{DPCH}^{div}}$$

the matrix $M_1$ can be presented as follows:

$$M_i = \sqrt{P_{tot}/2} \begin{bmatrix} a|h_{1,i}|^2 + b|h_{2,i}|^2 & bh_{1,i}^* h_{2,i} - ah_{1,i}^* h_{2,i} \\ ah_{1,i} h_{2,i}^* - bh_{1,i} h_{2,i}^* & a|h_{1,i}|^2 + b|h_{2,i}|^2 \end{bmatrix}$$

From the STTD performance point of view it is essential that the scaling factor x is chosen in the way that the non-diagonal elements of $M_1$ (which present the interference between the STTD streams) are zero. This is achieved when $$a = b \Rightarrow x = \sqrt{\frac{P_{CPICH}}{P_{DPCH}^{div}}}.$$

The above mentioned power ratio can be easily estimated e.g. from the corresponding channel estimates.

Figure 2:
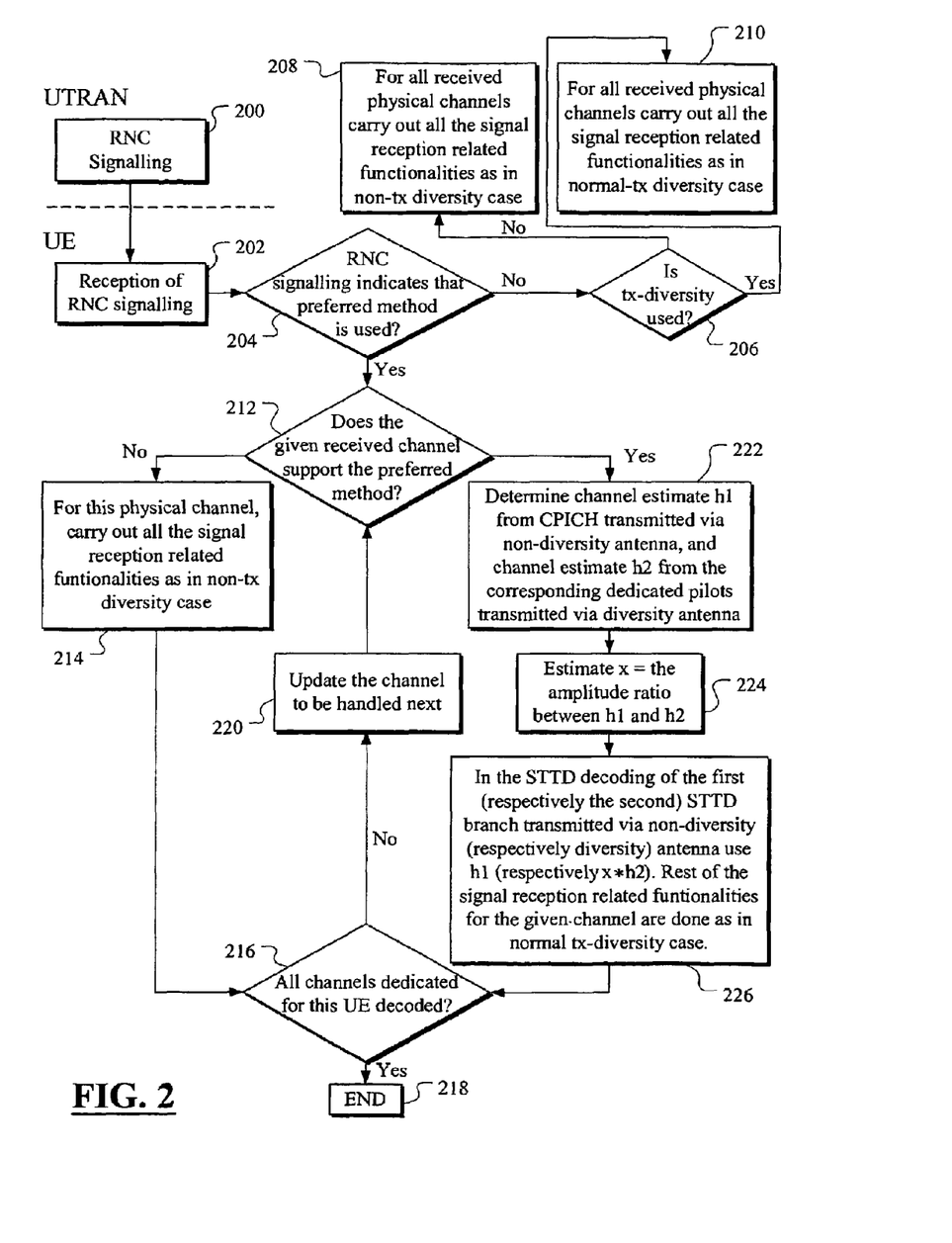
FIG. 2 shows a flow chart illustrating a series of steps carried out in a user equipment in response to radio network controller (RNC) signalling received from the UTRAN, according to the present invention.

FIG. 2 is a simplified flow chart showing radio network controller (RNC) signalling 200 from the UTRAN to the UE, according to the present invention. The RNC signalling is received 202 in the UE and the signalling indicates whether the method according to the present invention is to be used or not. If not, as decided in a step 204, a decision is made in a step 206 as to whether transmit diversity is used or not. If not, as shown in a step 208, for all received physical channels signal reception related functionalities are carried out as is normally done in non-transmit diversity cases. If the decision step 206 determines that transmit diversity is in fact used, then a step 210 is carried out in which for all received physical channels all the signal reception related functionalities are carried out as are carried out in normal transmit diversity cases.

Referring back to decision step 204, if the RNC signalling indicates that the method according to the present invention is to be used, then a step 212 is carried out in which a decision is made as to whether a given received channel supports the preferred method or not. If not, for the given physical channel, all the signal reception related functionalities carried out are those that are used in non-transmit diversity cases. A decision is then made in a step 216 if all channels dedicated for this UE have been decoded or not. If so, then a return is made in a step 218. If all of the channels are not yet then decoded, then a step 220 is carried out to update the channel to be handled next and the step 212 is carried out again to determine if the next received channel supports the method of the present invention. In such a case, a step 222 is carried out to determine a channel estimate h1 from CPICH transmitted via a non-diversity antenna, and another channel estimate h2 from the corresponding dedicated pilots transmitted via a diversity antenna from the base station.

A step 224 is then carried out to estimate the amplitude ratio x between h1 and h2. In a step 226, in the STTD decoding of the first (respectively, the second) STTD branch transmitted via the non-diversity (respectively, diversity) antenna, use h1 (respectively x*h2). The rest of the signal reception related functionalities for the given channel are done as for the normal transmit diversity case. The step 216 is then carried out again to determine if all of the channels dedicated for this UE are decoded are not. If not, the steps 220, 212 are carried out again to handle the next channel. If all of the channels have been decoded, then a return is made in the step 218.

All in all, for a UE supporting the STTD and use of dedicated pilots as a phase reference as described in 3GPP standardization this will add an additional combination. All the functionalities needed should be available, as such. Use of dedicated pilots as a phase reference is optional until Rel-5. A UE capable of supporting this invention needs to have following functionalities:

use of CPICH as a phase reference, use of dedicated pilots as a channel estimate for the diversity antenna, be able to estimate the amplitude ratio between CPICH and dedicated pilots, ability to decode STTD so that the first STTD branch is decoded by using the channel estimate computed from CPICH and the second STTD branch by using the scaled (by the amplitude ratio between CPICH and dedicated pilots) channel estimate computed from the dedicated pilots of the corresponding channel and ability to receive the UTRAN signalling indicating the usage of this functionality and function according to it.

From network elements this invention requires the support for STTD and also a mechanism to activate STTD on channels intended for the UE's supporting this feature independent of mode used on CPICH. A UTRAN supporting this feature needs to be able to:

(NodeB functionality) use the STTD encoding only for the selected downlink channels without applying the TX-diversity on channels that could be used by UE's not supporting the capability of this invention (e.g. CPICH, PCCPCH).

(UTRAN functionality) carry out the needed signalling for the UE's supporting the functionality described in this invention.

UTRAN signalling could consist of:

use existing signalling so that if UE signalled to use STTD and dedicated pilots as phase reference it will function as preferred embodiment suggests; or specify novel signalling for this feature.

Figure 3:
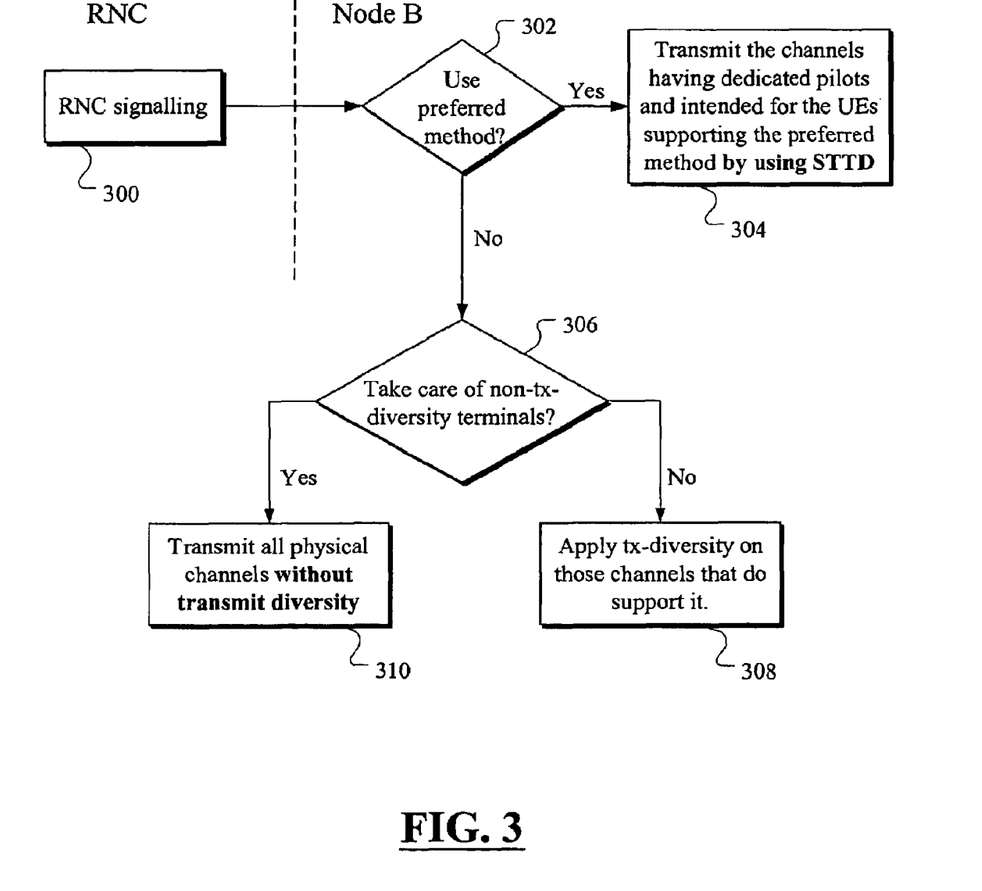
FIG. 3 shows a flow chart illustrating a series of steps carried out in a base station (Node B) in response to RNC signalling received from the UTRAN preparatory to carrying out the steps shown in FIG. 2, according to the present invention.

FIG. 3 shows RNC signalling 300 from the UTRAN to the base station (Node B) and a series of steps carried out in the Node B in response to this RNC signalling received from the UTRAN. In a step 302, the Node B determines from the RNC signalling whether the methodology according to the present invention is to be used or not. If so, a step 304 is carried out to transmit the channels having dedicated pilots and intended for the UEs supporting the preferred method by using STTP. Such a methodology has been shown already in connection with FIG. 2 above.

If it is determined in the step 302 that the methodology according to the present invention is not be used, it is determined in a step 306 as to whether the non-transmit-diversity terminals should be taken care of or not. If not, transmit diversity is applied on most channels that do support it as indicated in a step 308. If so, all physical channels are transmitted without transmit diversity as indicated in a step 310.

From the foregoing, it will be seen that very little change needs to be made in the network and in the user equipment in order to seamlessly introduce transmit diversity into networks in which UEs are already deployed not having the ability to receive signals from the base station with transmit diversity. This will make the adoption of transmit diversity in the network by certain operators much easier.

In order to illustrate the performance of the preferred embodiment in DPCH channel, the inventors performed computer simulations by using the simulation parameters depicted in the Table 1. The simulation results are presented in the FIG. 1.

TABLE 1

Link level simulation parameters

| | |
|---|---|
| Chip rate 3.84 | Mchip/s |
| Channel symbol rates | 30 ksps |
| Info bit rate | 12.2 kbit/s |
| Slot format | 11 (TS 25.211) |
| DPCH pilot symbols | 4/slot |
| Power control | Off |
| Channel estimation | 1-tx: From CPICH STTD: 1) Both STTD branches from CPICH 2) Both STTD branches from DPCH 3) First STTD branch from CPICH, second from DPCH (preferred embodiment) |
| Channel modeling | Modified ITU Pedestrian A at 3 km/h |
| FEC | ⅓-rate CC |
| G | 6 dB |
| Total CPICH power | −10 dB |
| TTI length | 20 ms |
| Performance measure | DPCH Ec/Ior vs. BLER |

Figure 1:
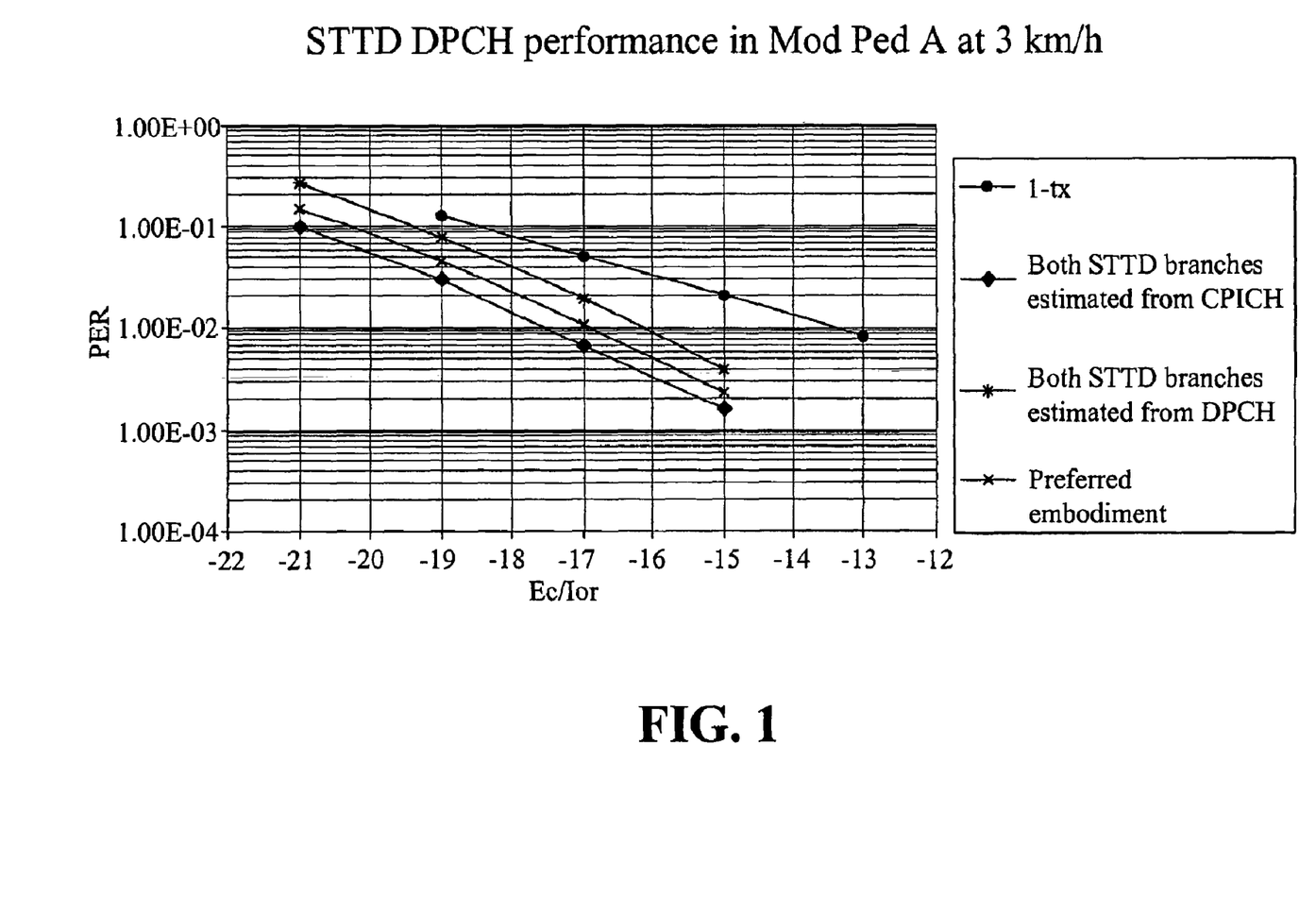
FIG. 1 shows STTD DPCH performance in Modified Pedestrian A channel.

As the performance shown in FIG. 1 indicates, at 1% BLER level the preferred embodiment has more than 3 dB performance gain over the non-diversity (i.e. 1-tx) transmission and approximately 1 dB performance gain over the case, where both STTD branches are estimated from the DPCH pilots. This proves the feasibility of the preferred embodiment.

The proposed solution will enable the network to start to utilize the STTD on dedicated channels without requiring withdrawing the already launched UEs from the market. This method provides a feasible way to make progress in the utilization of transmit diversity modes.

To enable this method further standardization work is needed to provide agreed support on UE's as well for network.

This method is now presented only in case of two transmit antennas but could be extended to account multiple (greater than 2) transmit antennas e.g. MIMO scenarios also.

It is clear to anyone of skill in the art how to implement the above described steps as such. It will be apparent to such a person that both the UTRAN and the UE will have signal processing capabilities able to create the appropriate signalling from the UTRAN to the UE and that the UE will have the appropriate reception equipment in the form of a receiver and other hardware capable of carrying out the steps shown in FIG. 2. Such may include typical dedicated or general purpose signal processing hardware having a central processing unit, input/output ports, memory devices including volatile memory and permanent memory as well as interconnecting circuitry for carrying data, address and control signals. The steps outlined in FIG. 2 may be coded in a programming language and stored in the permanent memory of the device so that the various steps can be retrieved and executed according to the programmed instructions under the control of the central processing unit. Or the same functionality could be incorporated into an integrated circuit. All of this will be evident to anyone of skill in the art and the same may be said for the hardware necessary to carry out the steps shown in FIG. 3 above in the UTRAN and the base station (Node B).

Figure 6:
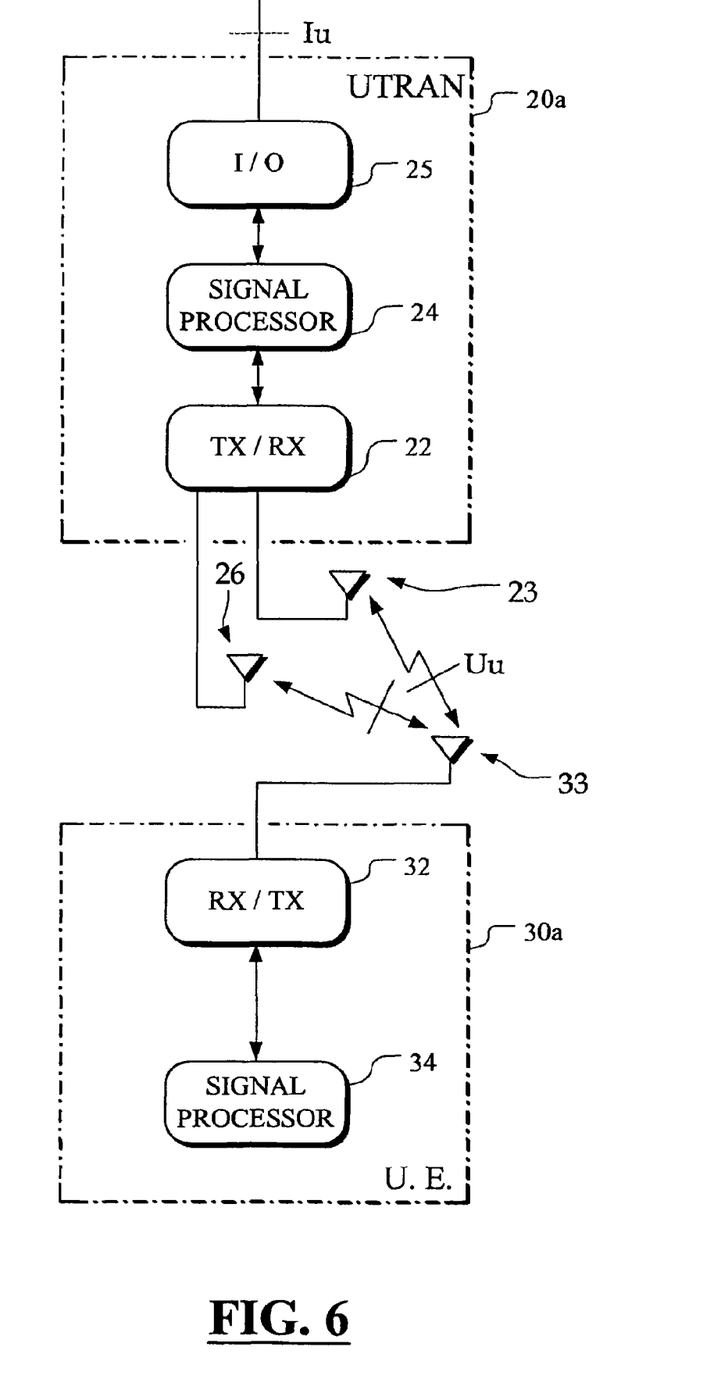
FIG. 6 shows a UTRAN having an Iu interface to a core network and a Uu radio interface to a user equipment, according to the present invention.

For instance, FIG. 6 shows a UTRAN 20a having an Iu interface to a core network (not shown) and a Uu radio interface to a user equipment 30a. Within the user equipment 30a is a receiver/transmitter 32 connected to an antenna 33 at one end of the Uu interface. Also connected to the receiver/transmitter 32 is a signal processor 34 which is able to carryout the steps 202-226 by means of any of the hardware described above such as an integrated circuit or a general purpose signal processor. Thus, the user equipment 30a is able to utilize antenna diversity from the UTRAN 20a in a system such as shown in general outlines in FIG. 4 where the UTRAN 20a is connected to a core network. In such a system, the UTRAN 20a is equipped to transmit to the user equipment 30a signals from more than one antenna. In any event, the user equipment 30a has a receiver 32 for receiving both common channels transmitted from one antenna and selected channels having dedicated pilots from more than one antenna and after receipt of these signals it provides them to the signal processor 34 for processing these received signals in the way as will be understood from the generally accepted principles of transmit (from a base station) diversity. Such techniques are shown for example in the above-mentioned TS 25.211. The steps of receiving the common channels and the dedicated pilots and processing them in the processor 34 shown in FIG. 6 may be carried out, as mentioned previously, as a series of programmed steps which are coded according to a selected programming language and stored on a computer readable medium within the signal processor 34 or in a separate functional block accessible by the signal processor 34. The equivalent functionality could be carried out in other ways as well, such as by means of an Application Specific Integrated Circuit (ASIC).

The UTRAN 20*a* includes a base station or Node B for carrying out the above mentioned antenna diversity in such a system with the base station transmitting to the user equipment signals transmitted from more than one antenna. This is shown generally in FIG. 6 by a transmitter part of a transmitter/receiver 22 which is connected to an antenna 23 at the other end of the Uu interface. The transmitter/receiver 22 is connected to a signal processor of the UTRAN 20*a* which is in turn connected to an input/output device 25 that provides an interface (Iu) to the not shown core network. As mentioned, the UTRAN 20*a* has more than one antenna for purposes of transmit diversity and a second antenna 26 is shown in order to illustrate that the UTRAN is able to transmit more than one signal to the antenna 33 of the user equipment 30*a*. Thus, the UTRAN 20*a* transmits channels from more than one antenna 23, 26 from the Node B or base station of the UTRAN 20*a* to the user equipment 30*a* for selected channels having dedicated pilots. Channels for certain common channels are transmitted from only one antenna 23 as well as other selected channels. Both the certain common channels and the channels having the dedicated pilots are received by the user equipment antenna 33 and processed by the user equipment signal processor 34 according to the known principles of antenna transmit diversity.

What is claimed is:

1. A method of supporting antenna diversity in a communication system, the method comprising:
    receiving a signal from a first device at a second device in a first channel;
    determining if transmit diversity is applied to the first channel;
    if transmit diversity is applied to the first channel, determining a first channel estimate based on a first pilot signal received from the first device and determining a second channel estimate based on a second pilot signal received from the first device; and
    decoding the received signal based on the first channel estimate and the second channel estimate.

2. The method of claim 1, wherein the decoding comprises performing space time block coding based transmit diversity (STTD).

3. The method of claim 2, wherein decoding the received signal comprises:
    decoding a first STTD branch of the received signal using the first channel estimate;
    estimating an amplitude ratio between a transmission power of the first pilot signal and a transmission power of the second pilot signal;
    scaling the second channel estimate by the estimated amplitude ratio; and
    decoding a second STTD branch of the received signal using the scaled second channel estimate.

4. The method of claim 1, wherein the decoding comprises performing time switched transmit diversity.

5. The method of claim 1, wherein the first pilot signal is a common pilot channel.

6. The method of claim 5, wherein the second pilot signal is a dedicated pilot channel.

7. The method of claim 1, wherein the first pilot signal is a synchronization channel.

8. The method of claim 1, wherein the first pilot signal is a secondary common control physical channel.

9. The method of claim 1, wherein the first channel estimate includes a phase reference.

10. A computer-readable medium including computer-readable instructions that, upon execution by processing means in a device cause the device to:
    in response to receiving a signal from a first device in a first channel, determine if transmit diversity is applied to the first channel;
    if transmit diversity is applied to the first channel, determine a first channel estimate based on a first pilot signal received from the first device and determine a second channel estimate based on a second pilot signal received from the first device; and
    decode the received signal based on the first channel estimate and the second channel estimate.

11. The computer-readable medium of claim 10, wherein decoding the received signal is based on space time block coding based transmit diversity (STTD).

12. The computer-readable medium of claim 11, wherein decoding the received signal comprises instructions configured to:
    decode a first STTD branch of the received signal using the first channel estimate;
    estimate an amplitude ratio between a transmission power of the first pilot signal and a transmission power of the second pilot signal;
    scale the second channel estimate by the estimated amplitude ratio; and
    decode a second STTD branch of the received signal using the scaled second channel estimate.

13. A device comprising:
    an antenna configured to receive a signal from a first device in a first channel;
    a processor; and
    a computer-readable medium operably coupled to the processor, the computer-readable medium comprising instructions that, upon execution by the processor, perform operations comprising
        determining if transmit diversity is applied to the first channel;
        if transmit diversity is applied to the first channel, determining a first channel estimate based on a first pilot signal received from the first device and determining a second channel estimate based on a second pilot signal received from the first device; and
        decoding the received signal based on the first channel estimate and the second channel estimate.

14. The device of claim 13, wherein decoding the received signal is based on space time block coding based transmit diversity (STTD).

15. The device of claim 14, wherein decoding the received signal comprises:
    decoding a first STTD branch of the received signal using the first channel estimate;
    estimating an amplitude ratio between a transmission power of the first pilot signal and a transmission power of the second pilot signal;
    scaling the second channel estimate by the estimated amplitude ratio; and
    decoding a second STTD branch of the received signal using the scaled second channel estimate.

16. A method of supporting antenna diversity in a communication system, the method comprising:
    determining if transmit diversity is supported by a first device at a second device;
    if transmit diversity is supported by the first device, encoding a first pilot signal and a second pilot signal at the second device and transmitting the first pilot signal and the second pilot signal to the first device from the second device, wherein the second pilot signal is encoded so as not to interfere with the first pilot signal; and if transmit diversity is not supported by the first device, encoding the first pilot signal at the second device and transmitting the first pilot signal to the first device from the second device.

17. The method of claim 16, wherein the first pilot signal is a common pilot channel.

18. The method of claim 17, wherein the second pilot signal is a dedicated pilot channel.

19. The method of claim 16, wherein the encoding comprises performing space time block coding based transmit diversity (STTD).

20. The method of claim 16, wherein the second pilot signal is encoded so as not to interfere with the first pilot signal by transmitting the first pilot signal from a first antenna of the second device and transmitting the second pilot signal from a second antenna of the second device, wherein the first antenna is different from the second antenna.

21. A computer-readable medium including computer-readable instructions that, upon execution by processing means in a device cause the device to:

determine if transmit diversity is supported by a first device;

if transmit diversity is supported by the first device, encode a first pilot signal and a second pilot signal and transmit the first pilot signal and the second pilot signal to the first device, wherein the second pilot signal is encoded so as not to interfere with the first pilot signal; and if transmit diversity is not supported by the first device, encode the first pilot signal and transmit the first pilot signal to the first device.

22. The computer-readable medium of claim 21, wherein the first pilot signal is a common pilot channel.

23. The computer-readable medium of claim 22, wherein the second pilot signal is a dedicated pilot channel.

24. The computer-readable medium of claim 21, wherein the encoding comprises performing space time block coding based transmit diversity (STTD).

25. The computer-readable medium of claim 21, wherein the second pilot signal is encoded so as not to interfere with the first pilot signal by transmitting the first pilot signal from a first antenna and transmitting the second pilot signal from a second antenna, wherein the first antenna is different from the second antenna.

26. A device comprising:

an antenna configured to transmit a signal to a first device;

a processor; and a computer-readable medium operably coupled to the processor, the computer-readable medium comprising instructions that, upon execution by the processor, perform operations comprising determining if transmit diversity is supported by the first device;

if transmit diversity is supported by the first device, encoding a first pilot signal and a second pilot signal at the second device and transmitting the signal to the first device, the signal comprising the first pilot signal and the second pilot signal, wherein the second pilot signal is encoded so as not to interfere with the first pilot signal; and if transmit diversity is not supported by the first device, encoding the first pilot signal and transmitting the signal to the first device, the signal comprising the first pilot signal.

27. The device of claim 26, wherein the first pilot signal is a common pilot channel.

28. The device of claim 27, wherein the second pilot signal is a dedicated pilot channel.

29. The device of claim 26, wherein the encoding comprises performing space time block coding based transmit diversity (STTD).

30. The device of claim 26, wherein the second pilot signal is encoded so as not to interfere with the first pilot signal by transmitting the first pilot signal from the antenna and transmitting the second pilot signal from a second antenna, wherein the antenna is different from the second antenna.

* * * * *